United States Patent
David

[11] 3,905,903
[45] Sept. 16, 1975

[54] METHOD OF PURIFICATION OF CATION REGENERANT SOLUTION

[75] Inventor: Ernest J. David, Fair Oaks, Calif.

[73] Assignee: Aerojet-General Corporation, El Monte, Calif.

[22] Filed: Jan. 24, 1975

[21] Appl. No.: 543,656

[52] U.S. Cl. .................. 210/31 C; 210/32; 210/73
[51] Int. Cl.² ........................................ B01D 15/08
[58] Field of Search ............ 210/26, 31 C, 31 R, 32, 210/73

[56] References Cited
UNITED STATES PATENTS

| | | | |
|---|---|---|---|
| 3,134,814 | 5/1964 | Sargeant et al. | 210/31 R X |
| 3,663,163 | 5/1972 | De Pree | 210/31 R X |
| 3,803,030 | 4/1974 | Montanaro et al. | 210/32 X |
| 3,846,297 | 11/1974 | Thaw | 210/31 C |

Primary Examiner—John Adee
Attorney, Agent, or Firm—Edward O. Ansell

[57] ABSTRACT

A solution of cation regenerant containing a complex of cation regenerant and anion regenerant is separated and purified by passage through a modified chromatographic media exhibiting a retarding effect on the cation regenerant or the complex. A solution of cation regenerant at a concentration of at least one normal and preferably 2 to 3 normal is passed through a column of solid, insoluble chromatographic media having a pK in the range of 9–10. This procedure does not require organic solvent elution and wash requirement is low giving a final eluate of minimum volume.

14 Claims, 5 Drawing Figures

METHOD OF PURIFICATION OF CATION REGENERANT SOLUTION

BACKGROUND OF THE INVENTION

1. Field of the Invention

The present invention relates to demineralization of water and, more particularly, to an improved method for the recovery of spent regenerants and especially cation regenerants from its mixture with complexes with other regenerants.

2. Description of the Prior Art

Deionization processes employing weak acid and weak base resins are per se known to the art. Two very real advantages in using these weak resins are the achievement of very high regeneration efficiencies, and a high theoretical loading capacity. Both types of weak exchangers can easily and effectively be regenerated to high levels by employing amounts of regenerant only slightly in excess of stoichiometry.

An improved process for the removal of mineral pollutants from water utilizing weakly acidic cation resin and weakly basic anion resin is disclosed in U.S. Pat. No. 3,700,592 in which the cation resin was regenerated with a chelating agent while the anion resin was regenerated with an organic solution of a base. The spent cation regenerant as a metal chelate was treated with carbon dioxide to precipitate a metal carbonate and free the chelate regenerant for recycle. The metal carbonate was then combined with the spent anion regenerant (amine salt) at elevated temperatures to precipitate the metal salt and recover carbon dioxide and the amine regenerant for recycle.

An improved recovery process which eliminates separate treatment of the spent regenerant before reconstituting the mineral salt is disclosed in a copending application, Ser. No. 496,619, filed Aug. 12, 1974, entitled "Solid Mineral and Regenerant Recovery for Ion-Exchange Resins". In the improved process, a basic spent cation regenerant is combined with an acidic spent anion regenerant to form a weak dissociable complex of the regenerants and to reconstitute the mineral salts. The spent cation and anion regenerants are combined either in a continuous or batch fashion by blending near stoichiometric quantities of the materials. This stoichiometric adjustment is based on the amount of the two streams necessary to reconstitute the mineral salts removed from the spent ion-exchange resins. The regenerant streams may be either aqueous solutions or organic solvent water solutions.

The complex is dissociated by a physical or chemical technique, such as distillation, complexation or extraction as disclosed in copending applications Ser. No. 496,484, filed Aug. 12, 1974, entitled "Recovery of Ion-Exchange Regenerants by Complexation" and Ser. No. 496,413, filed Aug. 12, 1974, entitled "Separation and Recovery of Ion-Exchange Resin Regenerants by Extraction".

It has been discovered that various levels of anion regenerant remain in the cation regenerant resulting from incomplete separation during the separation and recovery steps. The cation regenerant recovered from the evaporator heel of the cation regenerant processes generally contain approximately 25% equivalent percentage anion regenerant. This is the practical limit of separation available for the preferred trimethylamine (TMA) and methoxypropionic acid (MOPA) regenerants. Laboratory studies show that approximately 25–30% of the residual amine anion regenerant deposit on the cation resin when the contaminated cation regenerant was used directly for regeneration.

The deposition of 25–30% of this amine on the cation exchange resin during regeneration reduces the efficiency of the regenerated resin when used as a scrubber with resultant higher salt leakage and reduces the overall efficiency and capacity of the system. A second problem associated with this regenerant residue results from its behavior as a strong amine buffer. Metal ions from feed stock will quantitatively displace the amine residue from the resin. The amine, being a stronger base than the buffer, will displace the buffer which is eventually lost from the system. A buildup of anion regenerant in the cation exchange scrubber column over a large number of regeneration cycles results because of its higher base strength and causes a drop in operating capacity, i.e., reduced loading of the resin due to a poorer split and poorer water quality when this column is utilized as the final cation column in series in the water demineralization process disclosed in copending application Ser. No. 476,835, filed June 6, 1974, entitled "Buffered, Weak Ion-Exchange Water Demineralization Process", the disclosure of which is incorporated herein by reference.

Fractional examination of the spent cation regenerant during regeneration shows that the first fractions removed contain free MOPA and metal salts. Amine-MOPA salts only appear in the latter portion of the spent regenerant stream. This indicates that a separation of amine MOPA from MOPA occurs with the amine MOPA tending to tail behind. The trailing amine MOPA salt then sees many regenerated acid sites as it passes down the column and salt splitting with some amine deposition probably occurs. Since the MOPA moves through the column faster than the amine MOPA salt, little free MOPA remains to remove the amine from these loaded sites.

SUMMARY OF THE INVENTION

An improved method for eliminating the anion regenerant deposition on the cation resin column according to the invention involves removal of the anion regenerant from the cation regenerant prior to recycle of the cation regenerant. In accordance with the invention, the solution of cation regenerant containing the anion regenerant and its complex with cation regenerant is separated and purified by passage through a chromatographic media exhibiting retarding effect for the cation regenerant or the complex. Recycle of the purified, separated cation regenerant provides a fully regenerated cation resin. Separation of a cation regenerant forecut free of anion regenerant representing as much as 30–35% of the free cation regenerant is achieved.

Surprisingly, this procedure works well in the all aqueous cation regenerant mixture requiring no organic solvent elution and the efficiency appears to improve at concentrations of cation regenerant greater than one normal. Efficiency of separation appears to be optimized when the total cation regenerant concentration is in the range of 2 to 3 normal. Wash requirement to remove the retarded fractions is approximately 2 bed volumes giving a final eluate approximately half the concentration of the feed. It is possible to use the purified cation regenerant as the sole regenerant if the separation efficiency is high or the anion regenerant containing fractions may be recycled to the evaporator for further separation. If the efficiency is lower, it may be practical to regenerate first with the fraction of cation regenerant containing reduced amount of anion regenerant followed by completion of regeneration with the anion regenerant free forecut of cation regenerant.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
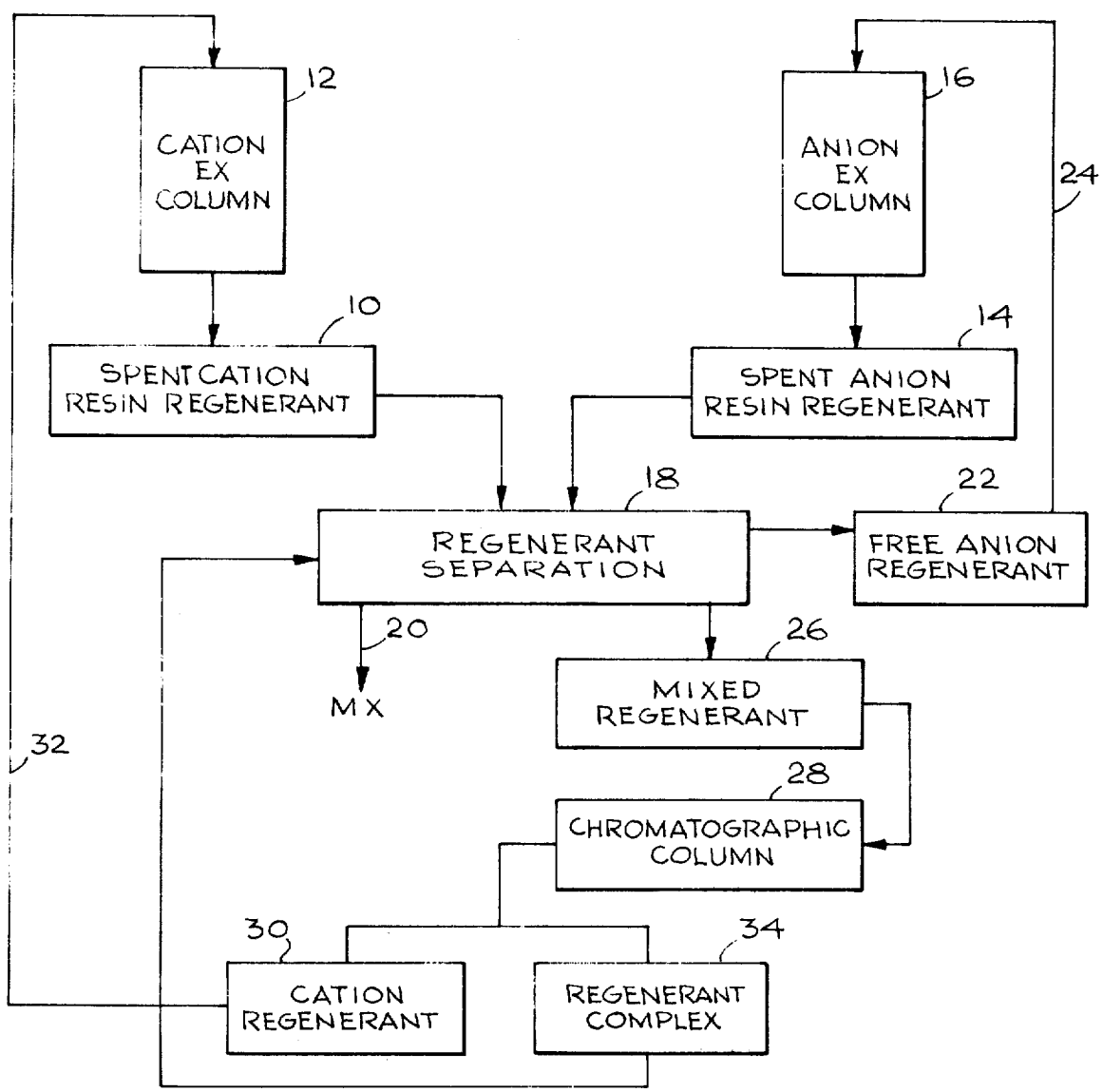
FIG. 1 is a block diagrammatic view of the purification and regenerant recovery process of the invention.

Referring now to FIG. 1, a simple flow diagram describing the regenerant separation process is illustrated. The spent cation regenerant 10 from cation exchange resin column 12 and the spent anion resin regenerant 14 from anion exchange resin column 16 are combined in essentially stoichiometric proportion in vessel 18. The cation M from the spent cation regenerant $MR_c$ combines with the anion X from the spent anion regenerant $R_aX$ to form a weak dissociable complex $R_aR_c$ and to reconstitute the salt MX. The salt MX may be in solution depending on the water content of the neutralization mixture and precipitates on removal of this excess water from the system and is removed through line 20.

The weakly dissociable spent regenerant complex $R_cR_a$ is then separated into the separate regenerants preferably by distillation. If distillation is the employed technique, the more volatile regenerant, usually the anion regenerant, comes off first and is collected in tank 22 and recycled through line 24 to regenerate the spent anion exchange resin column 16. The less volatile regenerant, usually the cation regenerant, and the remaining mixed complex of the two regenerants, $R_cR_a$, collects in vessel 26. The mixed regenerant solution is then processed through a modified chromatographic media in column 28 which has a retarding effect either on the cation regenerant $R_c$ or on the remaining complex $R_cR_a$. The eluted pure cation regenerant is collected at 30 and recycled through line 32 to regenerate the spent cation exchange resin column 12 while the remaining regenerant complex collects in vessel 34 and can be recycled to vessel 18 for further separation.

While FIG. 1 illustrates the separation of regenerant mixtures in which the anion regenerant was the more easily removed, as for instance by distillation at 18, since it is more volatile than the cation regenerant, it is to be understood that there are instances when the cation regenerant is the more easily recoverable. In such instances part 22 in FIG. 1 would be labeled "Free Cation Regenerant" and a recycle path from 22 back to 12 would be shown. Conversely 30 would be labeled "Anion Regenerant" and would show a recycle path back to 16. In addition, 26 would contain a mixture of $R_a$ and $R_aR_c$.

The process of this invention is preferably utilized in conjunction with the purification of aqueous streams by the use of weak or moderately strong cation exchange and anion exchange resins. The resin beds may be mixed as disclosed in U.S. Pat. No. 3,700,592, filed June 6, 1974. These water purification techniques require a high degree of efficiency to be economical. Therefore, the resin regenerations should be essentially quantitative and the separation or recovery of the regenerants must be highly efficient. To achieve this separation, it is necessary that the complex formed between the cation regenerant and the anion regenerant be sufficiently dissociated to provide enough of the anion regenerant for its rapid removal by distillation, complexation or solvent extraction. This separation of the two regenerant means becomes progressively more difficult because the acid concentration increases as the amine anion regenerant is removed from the complex which reduces the dissociation of the complex.

Four general requirements must be met by the regenerants for the successful operation not only of the regeneration of spent ion-exchange resins, but also for the separation of the regenerants from each other: (1) the pK of the cation and anion regenerants must be low enough to assure quantitative regeneration of the respective ion-exchange resins, (2) the pK of these regenerants must be high enough to provide adequate dissociation of their complex to permit ease of separation, (3) the anion regenerant heel remaining in the cation regenerant after separation must not interfere with the regeneration of the cation resin or remain deposited on this resin after regeneration, and (4) the cation regenerant must be stable to the separation media and must be stable under the conditions of the separation step.

The pK of the regenerants will generally be between 3 and 7. Regeneration efficiency is related to the type of ion-exchange resin to be regenerated and the primary process of demineralization.

The regenerant-recovery process of the invention is generally adaptable to spent regenerant streams from separate or mixed beds of buffered or unbuffered, weakly acidic cation exchange resins and weakly basic anion exchange resins such as those disclosed in U.S. Pat. No. 3,700,592 and in U.S. patent application Ser. No. 95,286, filed Dec. 4, 1970.

The instant invention can be used with the aforementioned water purification techniques when techniques are applicable to removal of water soluble inorganic salts from water, mainly halides, sulphates, sulfites, phosphates, phosphites, carbonates, bicarbonates, nitrites and nitrates of such metals as K, Na, Ca, Ba, Mg, Sn, Fe, Cu, Zn, Al, V, Cr, Mn and others, and especially to the Group IA and IIA alkali and alkaline earth metals, the most naturally occurring impurities since these are difficult to remove by non-buffered processes.

The pK of the resins used in the aforementioned water purification techniques, both cationic and anionic should fall between about 3 and about 7. The resins are used in particulate bead form and may be large beads in the size range of 20–50 mesh or larger or small beads in the range of 40–80 mesh or smaller.

These resins can conveniently be obtained in the marketplace and can be utilized buffered or unbuffered depending on the water purification technique employed. Illustrations of the resins useful in the practice of such techniques and methods for their preparation may be found by reference to U.S. Pat. Nos. 2,340,111; 2,371,818; 2,597,437; 2,885,371 and 2,963,453, among others.

The regeneration process through the following steps after the cations and anions have been removed by the aforementioned techniques.

Cation Resin Regeneration

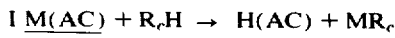

Anion Resin Regeneration

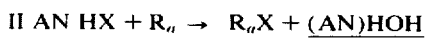

Combination

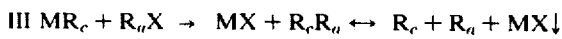

where:

$H(AC)$ = Cation Resin, H Form
$MX$ = Inorganic salt; $M$ = cation, $X$ = anion
$AN(HOH)$ = Anion Resin, OH Form
$MAC$ = Metal cation loaded cation resin
$AN\ HX$ = Anion loaded anion resin
$R_c$ = Cation regenerant
$R_a$ = Anion regenerant
$R_cR_a$ = Dissociable complex In steps I and II, the spent resins are regenerated to displace the metal cation M and anion X to essentially quantitatively regenerate the resins to the acid and base forms yielding a metal salt $MR_c$ of the cation regenerant and a salt $R_aX$ of the anion regenerant. In step III the two salts in essentially stoichiometric amounts are combined to reconstitute the removed salt MX and to form the dissociable complex of the regenerants $R_cR_a$.

The anion regenerant according to the invention is an organic base. Among the organic bases, the amines (substituted and unsubstituted) are particularly suitable herein as anion regenerants. These amines may be selected from compounds of the formula:

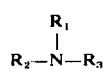

where $R_1$, $R_2$ and $R_3$ are selected from hydrogen, alkyl, alkynyl, alkenyl, aryl, alkaryl, aralkyl, alkoxy and may be substituted with hetero atoms or groups such as hydroxyl, ether, halogen, cyano; or $R_2$ and $R_3$ may be linked to form a cycloaliphatic structure. The molecular weight of the amine is preferably maintained below about 500 and preferably below 200 to avoid extensive swelling and deterioration of the resin particles. Preferred anion regenerants have a pK in water at 25°C of 5 to 7. The pK of the regenerant is a compromise between the ability to regenerate and the ability to separate the regenerants. As the basicity decreases, the ability to regenerate decreases but the separation from the cation regenerant is facilitated.

Representative amine anion regenerants are N,N-dimethylethylamine, trimethylamine (TMA), pyridine, N-methylmorpholine, N,N-dimethyl-2-methoxyethyl amine, isopropanol amine, tri-n-octyl amine, tri-n-decyl amine, N,N-diethylmethyl amine, triethylamine and the like. Higher pK organic bases such as trimethylamine provide better separation from the cation regenerant. The regenerant should be at least two orders of magnitude in pK more basic than the anion resin for efficient regeneration.

The anion regenerant is generally provided in at least a 30% stoichiometric excess with respect to the anion loading level of the column, generally a 50 to 200% excess. Regeneration need not proceed to completion but may be 60% or more depending on requirements of the primary demineralization step. The regenerant stream may be water or organic solvent based such as an alcohol, suitably methanol. The water content must be at least 5%, preferably at least 10%, to allow efficient removal of anions while preventing collapse of the resin due to dehydration.

The cation resin regenerants are metal complexing agents and weakly acidic carboxylic acids which form weak, strongly dissociated complexes with the anion resin regenerant. The complexing agents are chelating agents and preferably those which are soluble in an appropriate organic liquid and which preferentially form organic-soluble chelates with specific metal ions. Selectivity of preferred chelates toward specific metal ions is attained primarily by adjusting the steric effects displayed by the chelating agent. Steric effects may be varied by proper choice of substituent groups.

Examples of monomeric chelating agents useful in our process include diketones, esters, amides, nitro-compounds, amines, amine acids, hydroxyl compounds and combinations of compounds containing these structures which are capable of enol formation and cyclization with metal ions to form chelates. Preferred chelating agents include nitrodiphenylamines and $\beta$-diketones. Particularly useful in our process are various sterically hindered $\beta$-diketones including those having a single exchangeable hydrogen. Specific examples of $\beta$-diketones having a single exchangeable hydrogen include the substituted cyclohexanones such as 2-acetyl-cyclohexanone.

In the case of a weakly acidic cation exchange resin loaded with calcium or magnesium ions, the $\beta$-diketone may be a cycloaliphatic diketone such as 1,3-cyclohexanedione and its derivatives as disclosed in U.S. Pat. No. 3,658,729. Although the above complexing agents are extremely effective regenerants for cation exchange resins, they suffer to some extent from loss through dimerization under alkaline conditions especially at elevated temperatures.

In copending application Ser. No. 496,619, filed Aug. 12, 1974, sterically hindered derivatives of 1,3-cyclohexanedione are disclosed which are not prone to the dimerization reaction. Substitution with aliphatic groups even in the 5 position inhibits the reaction while substitution in the 2 position (the site of the dimerization link) is particularly effective.

Substitution of 1,3-cyclohexanedione hindering groups does not adversely affect the capability of the compound to regenerate cation exchange resins. However, the nature of the substitutent has a significant influence on both the water and/or methanol solubility of the regenerant and hence it is desirable to substitute with such polar groups as ethers, nitriles and the like in order to provide optimum solubility to achieve high concentrations of regenerant.

The preferred carboxylic acid cation resin regenerants are hydroxy or alkoxy substituted alkanoic acids of the formula:

where $R^1$, $R^2$ and $R^3$ may be any of —H, —OH, —$(CH_2)_nCH_3$, —$O(CH_2)_n$—$CH_2R^5$, —$O[(CH_2)_qO]_mCH_2R^5$ where $n$ is an integer from 0 to 5, $m$ is an integer from 1 to 3, $q$ is an integer from 1 to 3 and $R^5$ is —H or —OH; provided at least one of $R^1$, $R^2$ and $R^3$ contain at least one —C—O—C— or —C—OH moiety. $R^4$ is a divalent aliphatic hydrocarbon bridge containing 0–4 carbon atoms. The regenerants are disclosed in more detail and are claimed in U.S. patent application Ser. No. 496,482, filed Aug. 12, 1974, the disclosure of which is incorporated herein by reference.

The hydroxyl or alkoxyl substituents provide high solubility for the parent acid and the salts of stripped metal cation, particularly such alkaline earth metal ions as calcium and magnesium. These substituents also insure that the acid is high boiling and demonstrates non-azeotropic behavior for ease of separation from the anion regenerant such as a tertiary amine. The weak complexing ability of these acids can be a positive factor in enhancing cation removal.

Specific cation resin regenerants are α-hydroxy alkanoic acids of from 2–6 carbon chain length, β-hydroxy acids of from 2–6 carbon atom chain length and the methyl, ethyl and propyl ethers of the above acids. Representative acids are α-lactic acid, β-lactic acid, β-methoxypropionic acid (MOPA) and 4,7-dioxacaprylic acid (DOCA).

The cation regenerant is preferably utilized on excess in order to achieve efficient regeneration. The excess is suitably at least 50% of the amount theoretically required and preferably at least 100% of the stoichiometric amount. Furthermore, these cation regenerants are capable of efficient regeneration even in the presence of anion regenerant residues and salt heels. In fact, relatively high concentrations of these residues have little effect on regeneration efficiency.

Liquid chromatographic separations, in general, are achieved by passing a very dilute solution of the materials to be separated over a substrate which preferentially associates with the different materials to be separated. Removal of these materials from a column of the substrate is generally achieved by progressive elutions with a series of different solvents. Ion-exchange resins can also be used as substrates for the separation of mixtures of materials. The use of ion-exchange resins is described by Eric E. Conn and P. K. Stumpf in "Outlines of Biochemistry", 2nd Ed., 1967, John Wiley & Sons, as follows at page 438:

"Electrostatic attraction of oppositely charged ions on a polyelectrolyte surface forms the basis of ion-exchange chromatography. Typical systems include the synthetic resin polymers, such as the strongly acidic cation exchanger Dowex-50, a polystyrene sulfonic acid, and the strongly basic anion exchanger Dowex-1, a polystyrene quaternary ammonium salt. Cellulose derivatives such as carboxymethyl cellulose (CMC) and diethylaminoethyl cellulose (DEAE) exchangers have been very successfully used in protein purification.

"The basic principle involves an electrostatic interaction with the exchanging ions and the normal charge on the surface of the resin. These reactions are considered to be equilibrium processes and involve diffusion of a given ion to the resin surface and then to the exchange site, the actual exchange, and finally diffusion away from the resin. The rate of movement of a given ionizable compound down the column is a function of its degree of ionization, the concentration of other ions, and the relative affinities of the various ions present in the solution for charged sites on the resin. By adjusting the pH of the eluting solvent and the ionic strength, the electrostatically held ions are eluted differentially to yield the desired separation."

As indicated above, in practice separation of chemical compounds by chromatography is achieved in highly dilute solutions and frequently by use of a series of eluants.

The modified chromatographic separation means of this invention, in contrast, operates most efficiently on streams containing a relatively high concentration of the materials to be separated and achieves the separation of a pure regenerant fraction from a mixture of one regenerant with a complex of the two regenerants. No further separation is required; inorganic salts present in the material to be purified are distributed throughout all the fractions and do not interfere with the use of the purified regenerants.

The chromatographic separation media suitable for use in the process of the invention is a solid, particulate material containing weak acid or weak basic functionality such that the pK is from 8–12. Particle size may be widely varied. Surface area increases with smaller sized but bed porosity decreases. Chromatographic materials are generally available in mesh sizes from 3–325, preferred materials having a mesh size from 20–200. The bed of chromatographic media is preferably contained in an elongated column having a ratio of length to diameter of at least 2/1 in order to optimize the balance between transition zone and capacity. A column height of 5 feet would appear to be a practical limit. The selection of mesh size and column configuration is dependent on the amount of regenerant to be separated and flow rate required for the requirements of a continuous or semi-continuous process.

The degree to which the cation regenerant can be separated from its complex appears to depend on the pK of the chromatographic absorbing media and the degree of associative bonding between the media and the complex. Strongly acid or strongly basic media commonly employed in chromatographic separation techniques as noted above irreversibly bind the anion or cation regenerant respectively and are not employable. Neutral chromatographic materials exhibit no effect in separating the cation regenerant from its complex.

The mechanism of separation is dependent on the loading of either the cation regenerant or the anion regenerant on the functional, i.e., weakly basic or weakly acidic sites of the chromatographic substrate, followed by either acid regeneration or hydrolysis. Separation of the cation regenerant from its complex with anion regenerant when eluting with water cannot be achieved with neutral chromatographic media such as polystyrene. However, the type of functional site does have an effect on the order of elution, the amount of cation regenerant separated, the wash requirements and the dilution of the eluates.

With weakly basic materials, the cation regenerant associates with the functional basic sites and the complex is eluted first followed by a pure cation regenerant fraction. However, elution with deionized water causes a dilution in the concentrations of the recovered free cation regenerant and complex. Furthermore, weakly acidic chromatographic media appear to provide some splitting of the complex with increased recovery of pure cation regenerant.

Laboratory experiments were conducted in a 1.5 cm diameter glass column containing a bed height of chromatographic media of 45 cm. Spent MOPA cation regenerant at a flow rate of about 0.25 ml/min was fed to the column. The columns were washed with deionized water.

EXPERIMENTS 1 TO 4

The chromatographic materials tested were (1) polystyrene chromatographic beads having a pK in water of 14.0, (2) Chelex-100 (a chelating resin containing weakly acidic imino-diacetic acid exchange groups on a polystyrene lattice) having a pK of 8.7, (3) polyurethane beads having a pK of 8.7 and (4) silica gel having a pK of 9.7.

The recovered MOPA regenerant feed had the following composition:

| | |
|---|---|
| Total MOPA | 3.22N |
| Free MOPA | 2.32N |
| TMA-MOPA | 0.74N |
| Na-MOPA | 0.16N |

Figure 2:
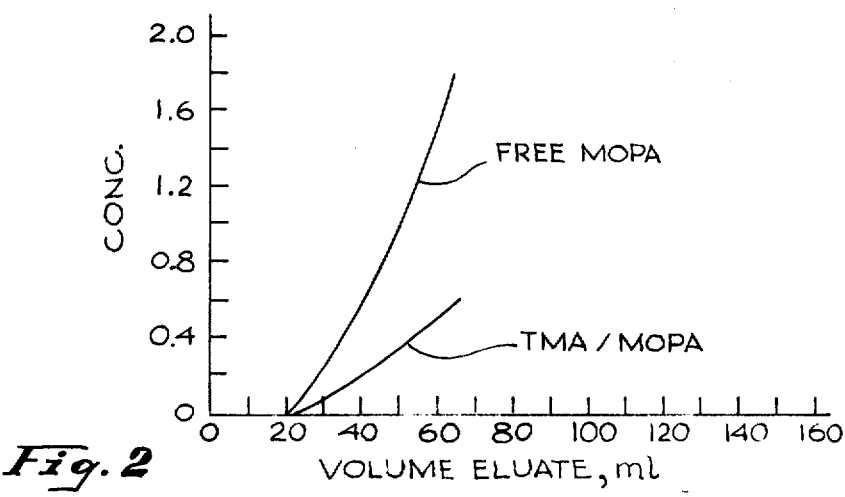
FIG. 2 is a graph of Experiment 1 in which a solution of MOPA and TMA-MOPA was added to a column of swollen polystyrene beads as the chromatographic media, and the abscissa being the eluate volume in ml and the ordinate being concentration in normality.

The plot illustrated in FIG. 2 demonstrates that polystyrene, a neutral chromatographic absorption media used extensively as the matrix for many ion-exchange resins, effected no separation of the MOPA/TMA-MOPA mixture. The concentration of TMA and MOPA in all fractions of the eluate is the same as the feed. This data indicates that separation is achieved by a delay in the elution of an acidic or basic component of the mixture caused by associative ionic reaction with the substrate followed by acid or base regeneration or hydrolysis.

Figure 3:
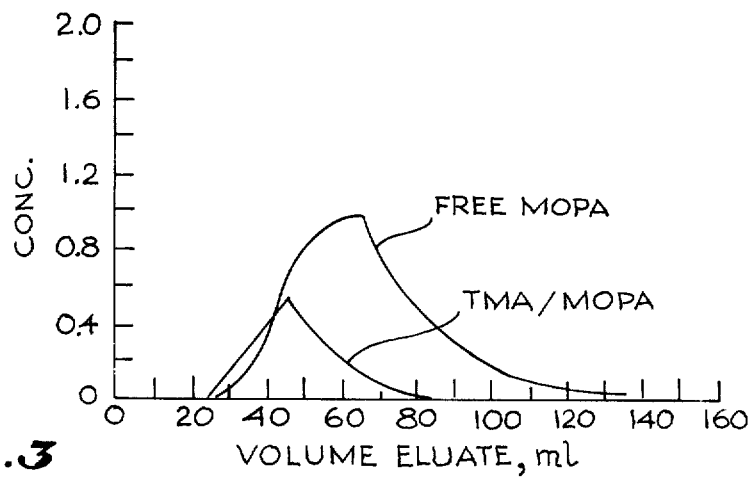
FIG. 3 is a graph of Experiment 2 utilizing a column of swollen polyurethane gel, the treatment solution, abscissa and ordinate being the same as FIG. 2.

The polyurethane utilized was a swollen gel prepared from the reaction of 15 equivalents of polyethylene glycol having a molecular weight of 4000, 85 equivalents of trimethylol propane and 107 equivalents of toluene diisocyanate. It is a slightly basic material with a pK of 8.5. As shown in FIG. 3, the polyurethane effects a separation of MOPA/TMA-MOPA, but the TMA-MOPA fraction is eluted first, followed by a pure MOPA fraction. Elution resulted in some dilution of both the free MOPA and TMA-MOPA concentrations as compared to the feed.

Figure 4:
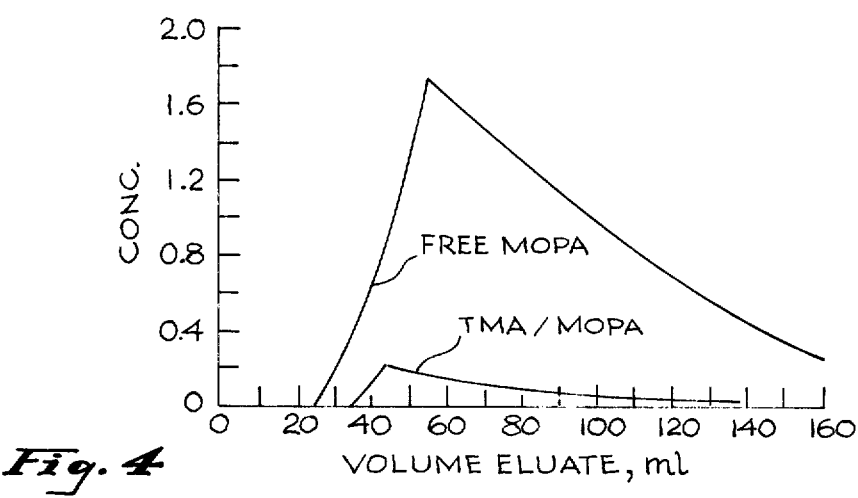
FIG. 4 is a graph of Experiment 3 utilizing a column of Chelex-100 resin, the treatment solution, abscissa and ordinate being the same as FIG. 2.

Chelex 100 has a pK of 8.7 and exemplifies a weakly acidic substrate. As shown in FIG. 4, Chelex 100 does effect a separation of MOPA/TMA-MOPA with pure MOPA being eluted first. However, it is also apparent from the data that the TMA is difficult to remove from the substrate (note the low peak height for TMA-MOPA and the long tail out). Furthermore, the recovered eluate is diluted by water during the resolution.

Figure 5:
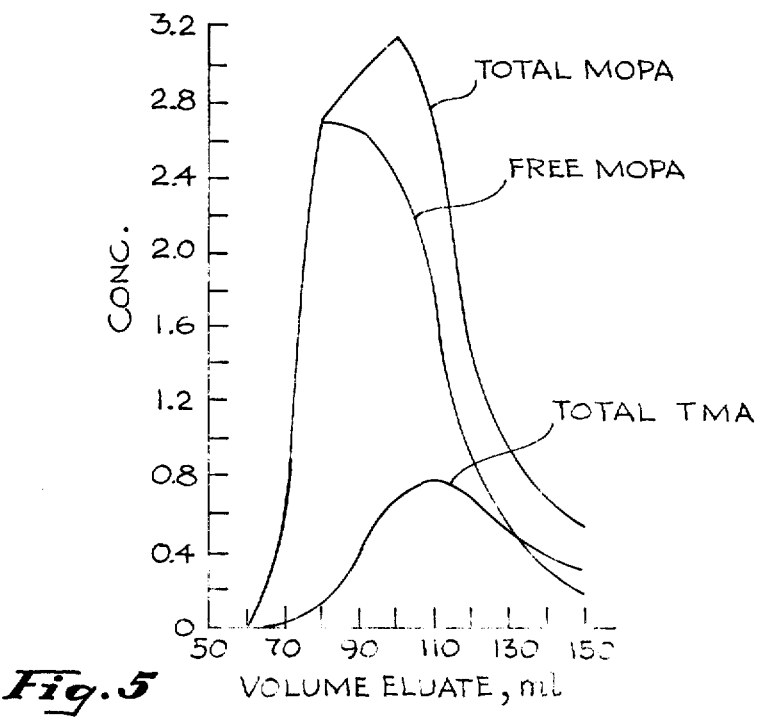
FIG. 5 is a graph of Experiment 4 utilizing a column of silica gel, the treatment solution, abscissa and ordinate being the same as FIG. 2.

As shown in FIG. 5, the preferred chromatographic media for separation of the MOPA/TMA-MOPA regenerant is silica gel having a pK from 9–10. Separation of a MOPA forecut free of TMA representing as much as 30–35% of the free MOPA is achieved. The wash requirements to remove the retarded TMA-MOPA fraction is approximately two bed volumes of deionized water giving a final eluate having a concentration of TMA-MOPA about one half of the feed.

Further studies have shown that efficiency improves at concentrations above 1N for total MOPA in the feed. At concentrations above 3N of total MOPA, the transition zone increases and the recovered MOPA is somewhat diluted. Optimum concentration of MOPA for most efficient separation of undiluted MOPA appears to be within the range of 2.0 to 2.5N.

EXPERIMENT 5

When DOCA is utilized in place of MOPA as the cation regenerant, and regardless of the nature of amine anion regenerant employed, results on the same order of magnitude are achieved with each of the four types of substrates illustrated above. This is to be expected due to the similarity of chemical structure for MOPA and DOCA.

Other substrates such as Sephadex, a material commonly used in biochemical separations, having a pK of about 14 and being more strongly basic than the polyurethane beads utilized in Experiment 3, were treated according to the procedures of Experiments 1–4 and were found to be not employable herein. Alumina and Duolite S-761, an ion-exchange anionic resin sold by Diamond Shamrock, gave inferior separations in that MOPA was permanently bound to the resin. This same activity would be expected for other cation regenerants. This indicates that substrate media having a pK lower than about 8 are not suitable for employment in this invention.

EXPERIMENT 6

Object: To demonstrate the applicability of the silica gel chromatographic purification to recovered cation resin regenerants containing α-lactic acid with a TMA heel.

A ⅝ inch diameter chromatographic type column loaded with 50 g (dry weight) chromatographic grade silica gel was employed.

A recovered regenerant composition of 56 ml of 1.42N TMA and 20 ml 87% α-lactic acid diluted to 100 ml with deionized water was prepared.

The 50 g of silica gel were first water swollen in deionized $H_2O$ and then added to the chromatographic column. The water level was drawn down to the top of the gel and 25 ml of the synthetic α-lactic acid cation resin regenerant was charged to the column. The flow rate was adjusted to about 0.25 ml/min and the following fractions were collected and analyzed by titration.

Table 1

| Fraction No. | Size, ml | Free | α-Lactic Acid, N Total | Trimethylamine, N |
|---|---|---|---|---|
| Feed | 25 | 1.1 | 1.82 | 0.72 |
| Eluate No. 1 | 25 | 0 | 0 | 0 |
| No. 2 | 10 | 0 | 0 | 0 |

Table 1-Continued

| Fraction No. | Size, ml. | α-Lactic Acid, N Free | Total | Trimethylamine, N |
|---|---|---|---|---|
| No. 3 | 5 | 0 | 0 | 0 |
| No. 4 | 5 | 0 | 0 | 0 |
| No. 5 | 5 | 0.16 | 0.16 | 0 |
| No. 6 | 5 | 0.46 | 0.46 | 0 |
| No. 7 | 5 | 0.75 | 0.75 | 0 |
| No. 8 | 5 | 1.02 | 1.02 | 0 |
| No. 9 | 5 | 1.29 | 1.29 | Trace |
| No. 10 | 5 | 1.06 | 1.15 | 0.09 |
| No. 11 | 10 | 0.54 | 0.94 | 0.40 |
| No. 12 | 10 | 0.09 | 0.53 | 0.34 |

Conclusions: The purification works essentially as well as it did for mixtures of MOPA and amine.

EXPERIMENT 7

Using a similar column as in Experiment 5, the purification of a mixture of 2-methyl-1,3-cyclohexanedione containing a small amount of TMA was studied.

A recovered regenerant composition of 6.3 g of the cyclohexanedione, 11 ml of 1.42N TMA, 20 ml of methanol (required to provide adequate solubility) and adequate deionized water to prepare 100 ml of solution was made up.

25 ml of the recovered regenerant composition was charged to the column and the level down to the top of the gel by the removal of water from the base of the column. Fractions of eluate were then drawn off at a flow rate of approximately 0.5 ml/min and a wash of 80% water/20% methanol was charged to the column. Analysis of the feed and fractions by titrimetry with standardized sodium hydroxide gave the following results.

Table 2

| Fraction No. | Size, ml. | 2-methyl-1,3-cyclohexanedione, N* Free | Total | TMA, N* |
|---|---|---|---|---|
| 1 | 25 | 0 | 0 | 0 |
| 2 | 5 | 0 | 0 | 0 |
| 3 | 5 | 0 | 0 | 0 |
| 4 | 5 | 0.076 | 0 | 0 |
| 5 | 5 | 0.080 | 0.080 | Trace |
| 6 | 5 | 0.080 | 0.080 | Trace |
| 7 | 5 | 0.060 | 0.076 | 0.016 |
| 8 | 5 | 0.050 | 0.076 | 0.026 |
| 9 | 5 | 0.050 | 0.080 | 0.030 |
| 10 | 5 | 0.045 | 0.072 | 0.027 |
| 11 | 10 | 0.050 | 0.072 | 0.022 |
| 12 | 10 | 0.050 | 0.075 | 0.025 |
| Feed | 25 | 0.084 | 0.23 | 0.146 |

*N = Normality

It is seen, therefore, that the technique of this invention may be employed with various types or regenerants. Thus the instant invention forms an additional step for prior known techniques relating to resin regeneration and regenerant recovery as especially applicable to water purification techniques.

It is to be understood that only preferred embodiments of the invention have been described and that numerous substitutions, alterations and modifications may be made without departing from the spirit and scope of the invention as defined in the following claims.

What is claimed is:

1. A method of separating an ion-exchange regenerant from a solution containing a complex of said regenerant with a counter-ion regenerant comprising the steps of:
    passing said solution through a chromatographic media capable of resolving said regenerant from the complex;
    passing eluant through the media to form a regenerant cut and a complex cut; and
    separating the regenerant eluate cut from the complex eluate cut.

2. A method according to claim 1 in which the solution is an aqueous solution containing free cation regenerant and a complex of cation regenerant and anion regenerant, said solution having a cation regenerant concentration of at least one normal.

3. A method according to claim 2 in which said concentration is from 2-3 normal and the eluant is water.

4. A method according to claim 2 in which the pK of the regenerants is between 3 and 7.

5. A method according to claim 2 in which the anion regenerant is an organic base.

6. A method according to claim 5 in which the organic base is an amine.

7. A method according to claim 6 in which the amine is trimethylamine.

8. A method according to claim 4 in which the cation regenerant is selected from metal chelate complexing agents and weakly acidic carboxylic acids.

9. A method according to claim 8 in which the cation regenerant is an hydroxy or alkoxy substituted alkanoic acid of the formula:

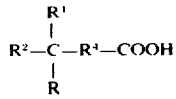

where $R^1$, $R^2$ and $R^3$ may be any of —H, —OH, —(CH$_2$)$_n$CH$_3$, —O(CH$_2$)$_n$—CH$_2$R$^5$, —O[(CH$_2$)$_q$O]$_m$ CH$_2$R$^5$ where $n$ is an integer from 0 to 5, $m$ is an integer from 1 to 3, $q$ is an integer from 1 to 3 and R$^5$ is —H or —OH, provided at least one of R$^1$, R$^2$ and R$^3$ contain at least one —C—O—C— or —C—OH moiety, and R$^4$ is a divalent aliphatic hydrocarbon bridge containing 0-4 carbon atoms.

10. A method according to claim 9 in which the cation regenerant is selected from α-lactic acid, β-lactic acid, β-methoxypropionic acid and 4,7-dioxacaprylic acid.

11. A method according to claim 4 in which the chromatographic media has a pK from 8-12 and contains weak acid or weak base functionality.

12. A method according to claim 11 in which the chromatographic media contains acid functionality and the cation regenerant cut is eluted first.

13. A method according to claim 12 in which the chromatographic media is a silica gel.

14. A method according to claim 13 in which the silica gel has a pK from 9-10.

* * * * *